United States Patent
Boe et al.

(10) Patent No.: US 9,762,061 B2
(45) Date of Patent: Sep. 12, 2017

(54) METHOD AND APPARATUS FOR TRANSFERRING ELECTRICAL POWER FOR SUBSEA APPLICATIONS

(71) Applicants: Ove Boe, Tanem (NO); Espen Haugan, Trondheim (NO)

(72) Inventors: Ove Boe, Tanem (NO); Espen Haugan, Trondheim (NO)

(73) Assignee: Siemens Aktiengesellschaft, München (DE)

( * ) Notice: Subject to any disclaimer, the term of this patent is extended or adjusted under 35 U.S.C. 154(b) by 360 days.

(21) Appl. No.: 14/318,020

(22) Filed: Jun. 27, 2014

(65) Prior Publication Data
US 2015/0008766 A1    Jan. 8, 2015

(30) Foreign Application Priority Data

Jul. 3, 2013    (EP) .................................... 13174852

(51) Int. Cl.
*H02J 3/22*    (2006.01)
*H02J 3/18*    (2006.01)
*H02J 3/34*    (2006.01)

(52) U.S. Cl.
CPC .............. *H02J 3/22* (2013.01); *H02J 3/1821* (2013.01); *H02J 3/1828* (2013.01); *H02J 3/34* (2013.01); *Y02E 40/30* (2013.01)

(58) Field of Classification Search
CPC ................. H02J 3/22; H02J 3/34; H02M 5/32
USPC ................. 307/11, 18, 3, 147, 98, 109, 181; 174/126.1
See application file for complete search history.

(56) References Cited

U.S. PATENT DOCUMENTS

| | | | |
|---|---|---|---|
| 4,199,804 A | 4/1980 | Juhlin | |
| 5,276,398 A * | 1/1994 | Withers ................. | G01R 33/34 324/318 |
| 2007/0114978 A1* | 5/2007 | Lindahl ..................... | H02J 3/18 323/207 |
| 2013/0014973 A1* | 1/2013 | Shinmoto ............... | B32B 15/01 174/126.1 |
| 2013/0033103 A1* | 2/2013 | McJunkin ................. | H02J 3/22 307/11 |
| 2013/0169044 A1* | 7/2013 | Stinessen .................. | H02J 3/34 307/18 |

FOREIGN PATENT DOCUMENTS

| | | | | |
|---|---|---|---|---|
| SE | WO 0126201 A1 * | 4/2001 | ................ | H02J 3/34 |
| WO | 0126201 | 4/2001 | | |
| WO | 2005031940 | 4/2005 | | |

OTHER PUBLICATIONS

European Search Report in corresponding European Patent Application No. EP 13 17 4852, dated Nov. 25, 2013, 5 pages.

* cited by examiner

*Primary Examiner* — Jared Fureman
*Assistant Examiner* — Win Htun
(74) *Attorney, Agent, or Firm* — Lempia Summerfield Katz LLC

(57) ABSTRACT

Methods for transferring electrical power in the sea include: generating AC power; and guiding, at least partially underwater, the AC power through a cable from a first end of the cable to a second end of the cable. A first reactor is connected near the first end of the cable and a second reactor is connected near the second end of the cable. Inductances of the first reactor and the second reactor are selected to at least partially compensate for reactive power generated in the cable.

21 Claims, 8 Drawing Sheets

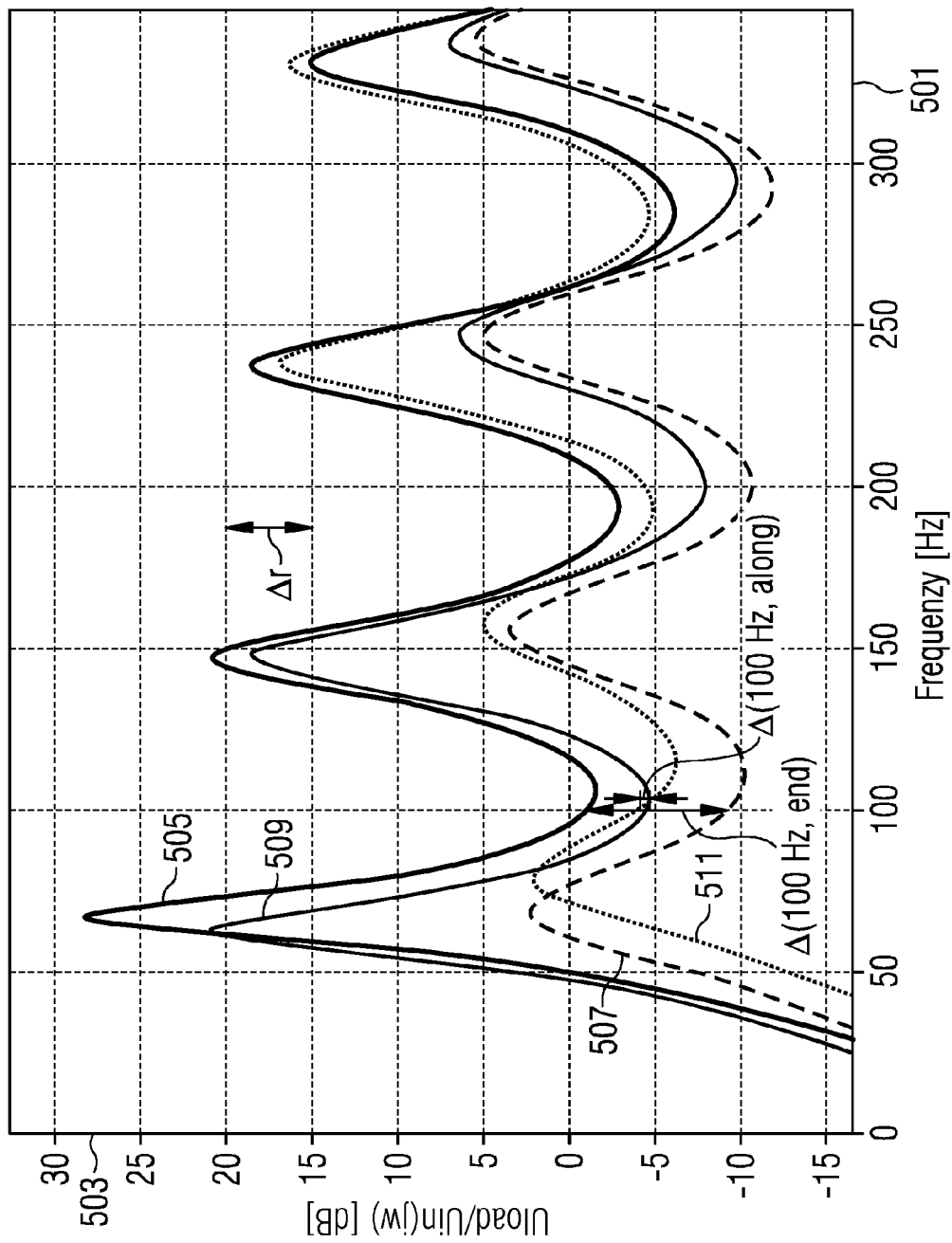

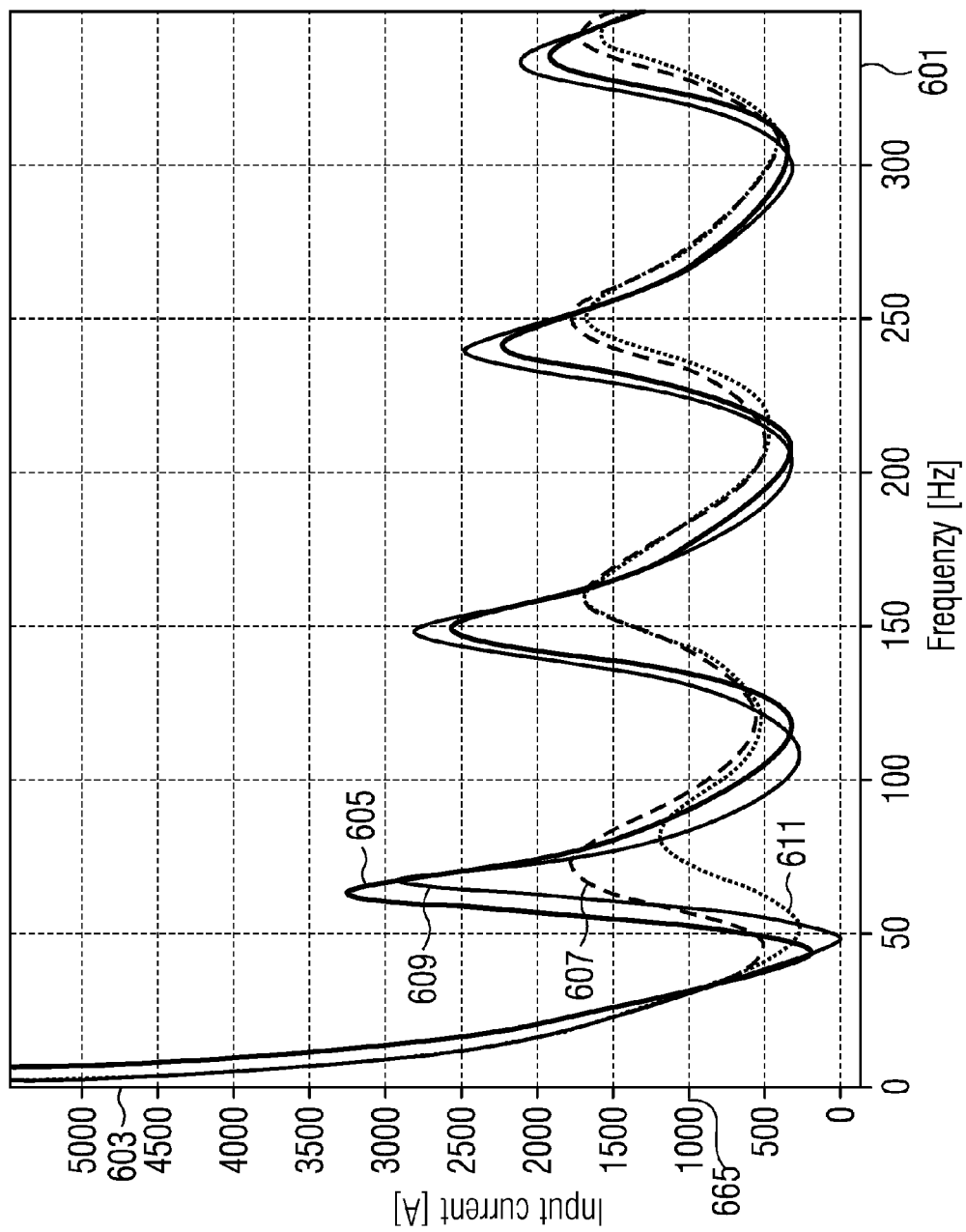

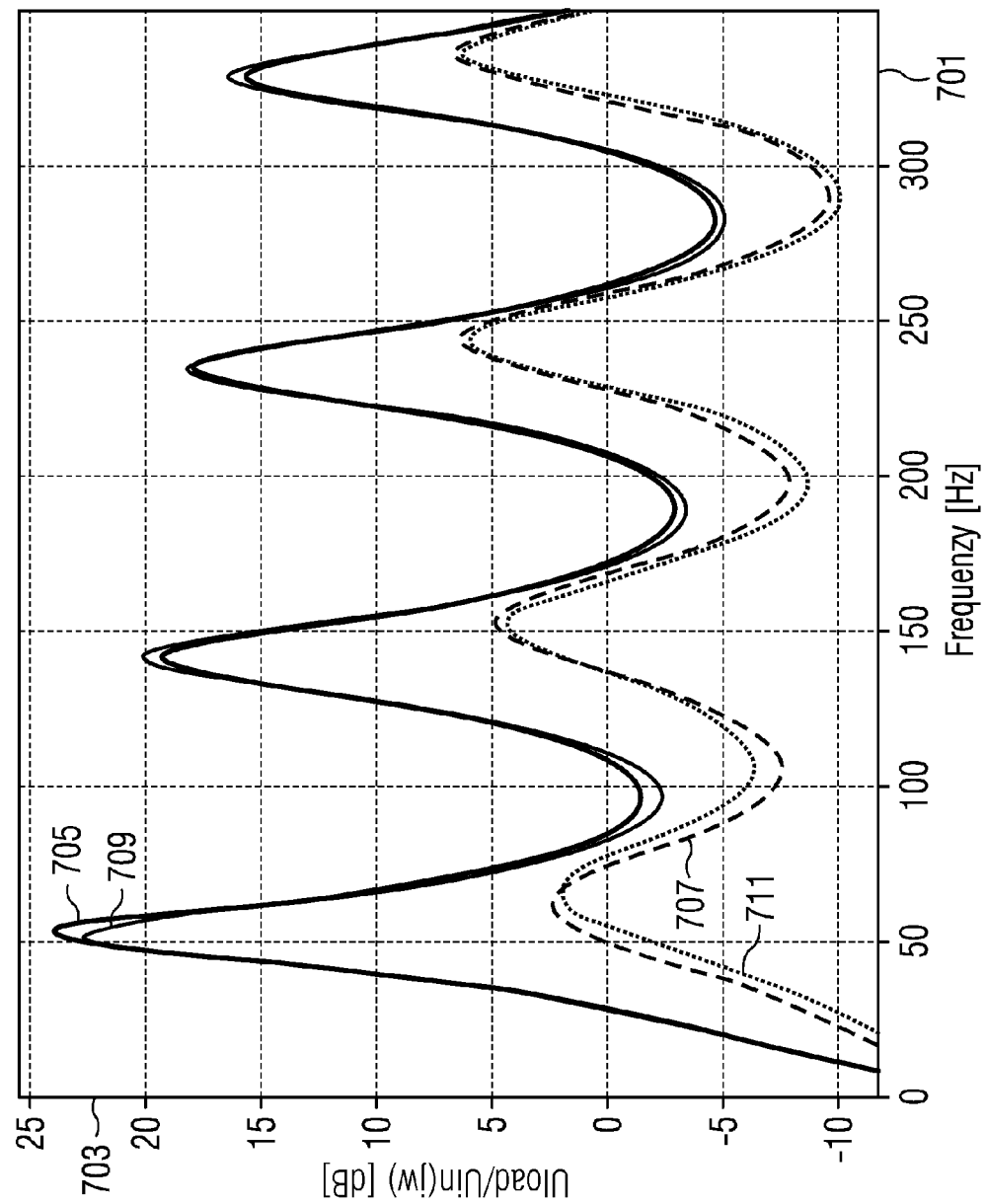

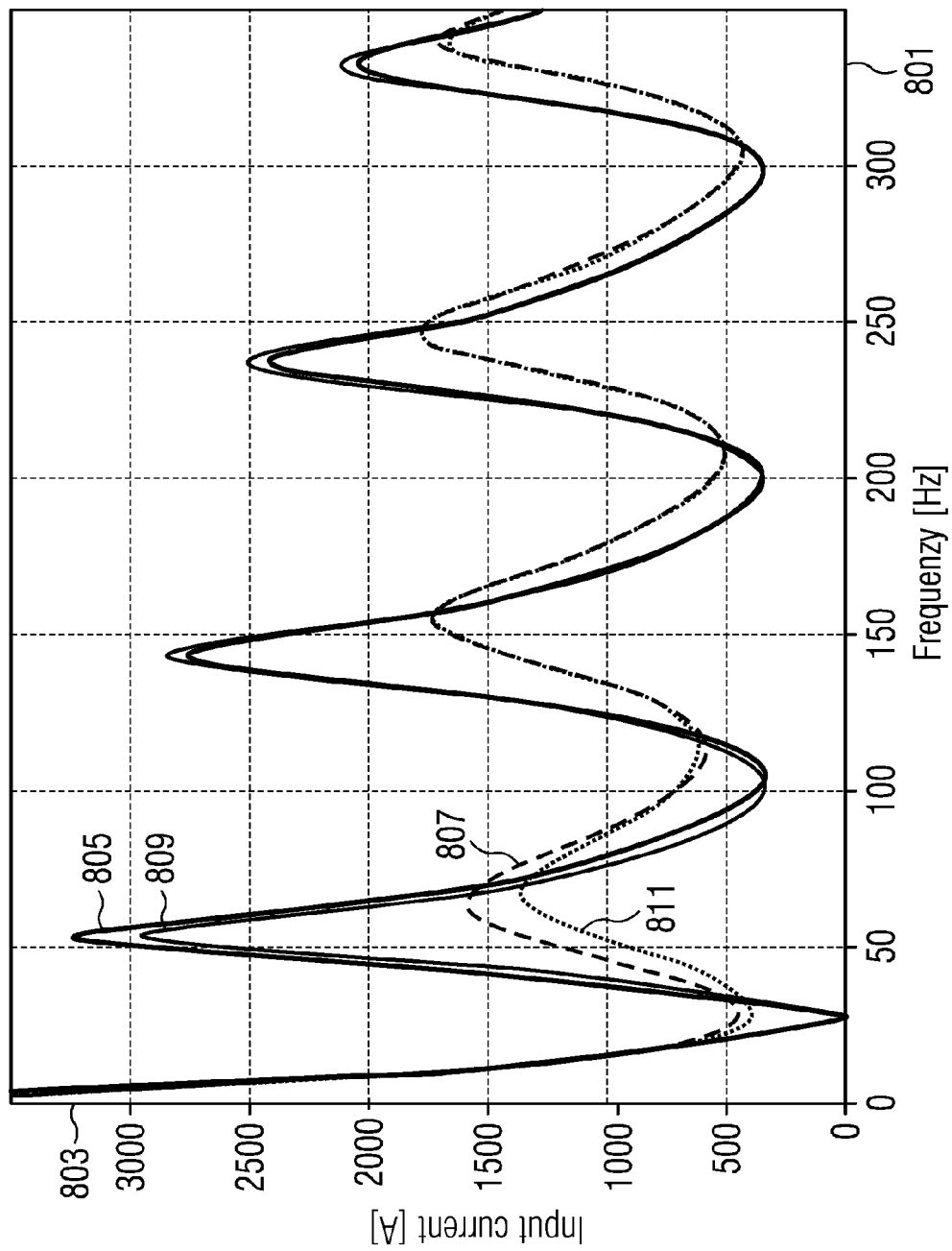

METHOD AND APPARATUS FOR TRANSFERRING ELECTRICAL POWER FOR SUBSEA APPLICATIONS

RELATED APPLICATIONS

This application claims the benefit of European Patent Application No. EP 13174852.7, filed Jul. 3, 2013. The entire contents of the priority document are hereby incorporated herein by reference.

TECHNICAL FIELD

The present invention relates generally to the transfer of electrical power in the sea (e.g., a subsea grid) and, in some embodiments, to provision of electrical power at subsea exploration sites.

BACKGROUND

Conventional electrical AC power cable transmission may be limited in distance due to the properties of the cable. The maximum AC transmission distance at 50/60 Hz may be between 100 km and 200 km. Currently, for longer distance transmission, DC transmission is used instead.

In subsea power applications, distances may be greater than 200 km. In arctic areas, hydrocarbon reservoirs with step-outs up to 600 km from shore may be explored. AC power may be used for powering consumers at a subsea exploration site (e.g., pumps, compressors, motors etc.). Therefore, in a conventional system, the DC power transmitted to the sea ground may be converted into AC power in order to power the consumers at the subsea exploration site. However, the conversion of DC power to AC power may involve large and heavy equipment that complicates set-up of the exploration site and also increases the costs of the system. When designing a subsea power grid, reliability may be a factor. To increase reliability of a subsea power grid, the complexity of the power grid may be limited. In addition, the number of components with low reliability (e.g., non-redundant types of components) may also be limited. At present, only medium voltage distribution technology for AC solution may be reliable. Consequently, DC power may be converted to AC power subsea for subsea DC transmission systems. The DC-to-AC converting system may be complex and use a large amount of components, thus reducing of the system as compared to a subsea AC transmission system.

SUMMARY AND DESCRIPTION

The scope of the present invention is defined solely by the appended claims, and is not affected to any degree by the statements within this summary.

A method and an apparatus for transferring electrical power in the sea may facilitate AC electrical powering of subsea consumers with step-out greater than the present day maximum transmission distance (e.g., 100-200 km). The method and apparatus may increase reliability and, at the same time, reduce the size of the equipment. In addition, AC consumers may be provided with AC power in a simpler manner involving smaller or lighter equipment as compared to a conventional system.

The present embodiments may obviate one or more of the drawbacks or limitations in the related art. For example, in some embodiments, a method for transferring electrical power in the sea (e.g., a subsea grid) is provided. The method includes generating AC power, and guiding, at least partially underwater, the AC power through a cable from a first end of the cable to a second end of the cable. A first reactor is connected near the first end of the cable, and a second reactor is connected near the second end of the cable. Inductances of the first reactor and the second reactor are selected/adjusted to—in some embodiments, at least partially and, in other embodiments, at least substantially (e.g., disregarding unavoidable inaccuracies)—compensate for reactive power generated in the cable. The phrase "at least partially compensate" as used to describe reactive power generated in the cable refers to compensation for the reactive power generated in the cable within unavoidable process and/or measurement errors. The phrase includes complete compensate for the reactive power generated in the cable. The inductances of the reactors may be selected/adjusted in order to compensate for a majority (e.g., in some embodiments between 90% and 100% and, in other embodiments, between 95% and 100%) of reactive power generated in the cable.

The first reactor and/or the second reactor may compensate for the reactive power generated by the capacitor effect of the cable. For this purpose, the inductances of the first reactor and the second reactor are appropriately selected. This selection may be performed by starting with an inductor size that will compensate for the total or a part of the cable by solving the equation $w*L=1/(w*C)$. In this equation, w is the angular frequency [rad/sec], L is the reactor inductance, and C is the capacitance of the total or a part of the cable. A respective reactor having the inductance as selected/determined may be associated with and connected to the total or the respective part of the cable.

On a first end, the respective reactor may be connected to the cable. On a second end, the reactor may be connected to an earth potential. The earth potential may be provided by a connector at the ground of the sea or may be provided by a connector above the sea level. By providing the first reactor and/or the second reactor, a change in voltage at the second end of the cable may be kept within acceptable limits, such that equipment at the subsea exploration site (e.g., equipment connected to the second end of the cable) may not be damaged and may not be tripped. Thus, operation may continue even if a load connected to the second end of the cable changes regarding its power consumption. Furthermore, resonances occurring within the cable that depend on the frequency of the AC power and the length of the cable may be reduced, thereby providing a secure and reliable operation for transferring the electrical power (e.g., a subsea grid).

In some embodiments, between 3 and 60 additional reactors may be connected along the cable between the first end of the cable and the second end of the cable. These additional reactors may be arranged spaced apart from each other and, in some embodiments, may be equally spaced apart from each other. By providing the additional reactors, compensation for the reactive power generated in the cable may be more effective in order to reduce a change in voltage when the load changes regarding its power consumption.

In some embodiments, the inductances of the first reactor and the second reactor and/or the inductances of the additional reactors may be selected based on a frequency of the AC power and properties of the cable (e.g., the capacity of all or a portion of the cable that the reactor is associated with and/or connected to). As a result, compensation of the capacitor effect may be improved.

In some embodiments, the reactors and/or the additional reactors are connectable and disconnectable from the cable. Depending on the configuration (e.g., depending on the power consumption of the load connected to the second end of the cable), some reactors may be connected to the cable and other connectors may not be connected to the cable in order to improve the compensation of the reactive power generated in the cable.

Calculations or simulations may be performed in order to determine whether to connect or whether to disconnect a given reactor from the cable.

In some embodiments, at least one reactor of the reactors or the additional reactors includes an active and/or a passive filter. The active filter may, for example, be an analog filter or a digital filter. In some embodiments, the filter may be adaptive, such that a filter band may be adjustable. A passive filter may, for example, include an inductance, such that the transfer of the AC power may be improved (e.g., by reducing resonance peaks).

In some embodiments, the inductances of the reactors and/or the inductances of the additional reactors are adjusted in order to avoid resonances that are close to the frequency of the AC power.

Resonances that are close to the frequency of the AC power may at least be reduced by appropriately adjusting or selecting the inductances of the reactors and/or the inductances of the additional reactors. As a result, transfer of the AC power may be improved.

In some embodiments, the reactors provide reactive compensation for 16.7 Hz or 50 Hz.

In some embodiments, conventional AC power having a frequency of 16.7 Hz or 50 Hz may be available. Thus, the method may employ a conventional power source that may thus widen the method's range of applicability.

In some embodiments, the method further includes adjusting the frequency of the AC power such that a voltage ratio (Uload/Uin) between a second voltage (Uload) and a first voltage (Uin) changes less than a threshold when a power consumption of a load connected to the second end of the cable changes from a first value to a second value (e.g., from 0 MW to 100 MW). The second voltage represents a potential difference between the second end of the cable (or a location where the load is connected) and a reference potential. The first voltage represents a potential difference between the first end of the cable (or an output terminal of a power supply supplying the AC power to the cable) and the reference potential.

In some embodiments, the frequency of the AC power may be adjusted for a situation when, for example, there is substantially no load connected to the second end of the cable. In some embodiments, the frequency of the AC power may be adjusted for a situation when, for example, there is an average load (e.g., an expected average load) connected to the second end of the cable. In some embodiments, for the average load expected for a given application (or, for example, zero load), the frequency may be optimized. Upon changing the power consumption of the load, the starting frequency may either be maintained or changed in order to keep a voltage change or voltage drop within acceptable limits.

In some embodiments, adjusting the frequency includes calculating a plurality of voltage ratio changes for a plurality of test frequencies, and considering at least two test power consumptions of loads for each test frequency of the plurality of test frequencies in order to obtain a respective voltage ratio change. The frequency to be adjusted is selected from the plurality of test frequencies having a calculated voltage ratio change that is lower than the threshold.

The calculation to obtain a plurality of voltage ratio changes may involve modeling the cable by setting up an equivalency circuitry or scheme that may include a number of PI-elements. The electrical properties of the entire system for transferring the electrical power may be calculated or obtained for each test frequency of the plurality of test frequencies. Based on the results of the calculations, the frequency or frequencies may be selected having the desired electrical properties.

The method may be simplified. For example, the method may be performed using a computing device, such as a computer or at least one arithmetic/logical processor.

In some embodiments, the method further includes calculating a plurality of input currents for a plurality of test frequencies. Each input current represents a respective current of the generated AC power supplied to the first end of the cable. In some embodiments, the method further includes considering at least one test power consumption of a load for each test frequency of the plurality of test frequencies. The frequency to be adjusted is selected from the plurality of test frequencies having an input current that is within a range determined by a rating of the cable.

The input current may be a parameter that may be controlled during transfer of the electrical power. In some embodiments, the cable may have a rating that defines a maximal current that may flow within the cable without damaging the cable. Thus, calculating the plurality of input currents for the plurality of test frequencies may facilitate selecting a frequency or frequencies that may result in proper operation of the transfer of the electrical energy without damaging the cable and other equipment (e.g., load units).

In some embodiments, a frequency between resonance peaks of a calculated voltage ratio curve is selected. In some embodiments, the method further includes selecting a frequency between a first resonance peak and a second resonance peak. In some embodiments, the method further includes selecting a frequency between a second resonance peak and a third resonance peak. The frequency may depend on properties of the cable (e.g., cross-sectional size and/or material).

When a frequency between resonance peaks of the calculated voltage ratio curve is selected, extremely high voltage may be avoided, thereby improving the security and reliability of the method and avoiding damage to the equipment.

In some embodiments, the method further includes transforming a voltage of the AC power to a higher voltage and supplying the transformed voltage to the first end of the cable, and/or transforming the AC power guided through the cable at the second end of the cable and supplying the transformed AC power to a load.

Since the power is provided as AC power, the size of iron cores within respective transformers may be reduced as compared to the transfer of electric power using a DC transmission method. Thus, the equipment used for performing the method may be less voluminous, lighter, and potentially less expensive than equipment used in a DC transmission method.

Transforming the voltage at the topside and transforming the AC power at the subsea side may provide a larger flexibility of voltage for supplying the AC power to the first end of the cable. Flexibility of the voltage at the second end of the cable may comply with voltage requirements of a subsea distribution grid.

In some embodiments, the frequency of the AC power is between 10 Hz and 300 Hz, in some embodiments between 50 Hz and 150 Hz, and in some embodiments different than 50 Hz. In some embodiments, the cable is arranged at least partially (e.g., between 80% and 100% of the length of the cable) underwater. The AC power may be supplied from an AC power supply (e.g., a generator or a converter) to the first end of the cable.

In a conventional system, only DC power has been transferred underwater. Relatively heavy and large equipment is used for converting the DC power to AC power at the subsea exploration site.

In some embodiments, the first voltage is predetermined and the second voltage is calculated for a given power consumption of the load using a model of the cable that includes a plurality of PI-elements. The second end of the cable is between 1000 m and 4000 m below sea level. The cable has a length between 100 km and 1000 km and, in some embodiments, between 200 km and 600 km. The voltage at the cable may be between 80 kV and 100 kV. The method further includes adjusting the frequency and/or the first voltage based on the load. The frequency may change (e.g., decrease). In some embodiments, the frequency may change (e.g. decrease) when power consumption of the load changes (e.g. increases).

It should be understood that features individually or in any combination that are disclosed, described, applied or provided for a method for transferring electrical power in the sea in accordance with the present teachings may also be applied individually or in any combination to an apparatus for transferring electrical power in the sea in accordance with the present teachings and vice versa.

In some embodiments, an apparatus for transferring electrical power in the sea includes a power supply configured to generate AC power, a cable configured to guide, at least partially underwater, the AC power through the cable from a first end of the cable to a second end of the cable, a first reactor connected near the first end of the cable, and a second reactor connected near the second end of the cable. Inductances of the reactors are selected to at least substantially compensate for reactive power generated in the cable.

It is to be understood that elements and features of the various representative embodiments described herein may be combined in different ways to produce new embodiments that likewise fall within the scope of the present teachings.

The following examples and representative procedures illustrate features in accordance with the present teachings, and are provided solely by way of illustration. They are not intended to limit the scope of the appended claims or their equivalents.

BRIEF DESCRIPTION OF THE DRAWINGS

Embodiments of the present teachings are now described in reference to the accompanying drawings.

FIG. 5 shows a graph depicting an exemplary dependency of a voltage ratio vs. frequency in accordance with the present teachings when two or more reactors are used to compensate for a capacity effect of a cable.

FIG. 6 shows a graph depicting an exemplary dependency of an input current vs. frequency in accordance with the present teachings when two or more reactors are used to compensate for a capacity effect of a cable.

FIG. 7 shows a graph depicting an exemplary dependency of a voltage ratio vs. frequency of AC power in accordance with the present teachings when two or more reactors are used to compensate for a capacity effect of a cable.

FIG. 8 shows a graph depicting an exemplary dependency of an input current vs. frequency in accordance with the present teachings when two or more reactors connected to the cable are used to compensate for a capacity effect of the cable.

DETAILED DESCRIPTION

Figure 1:
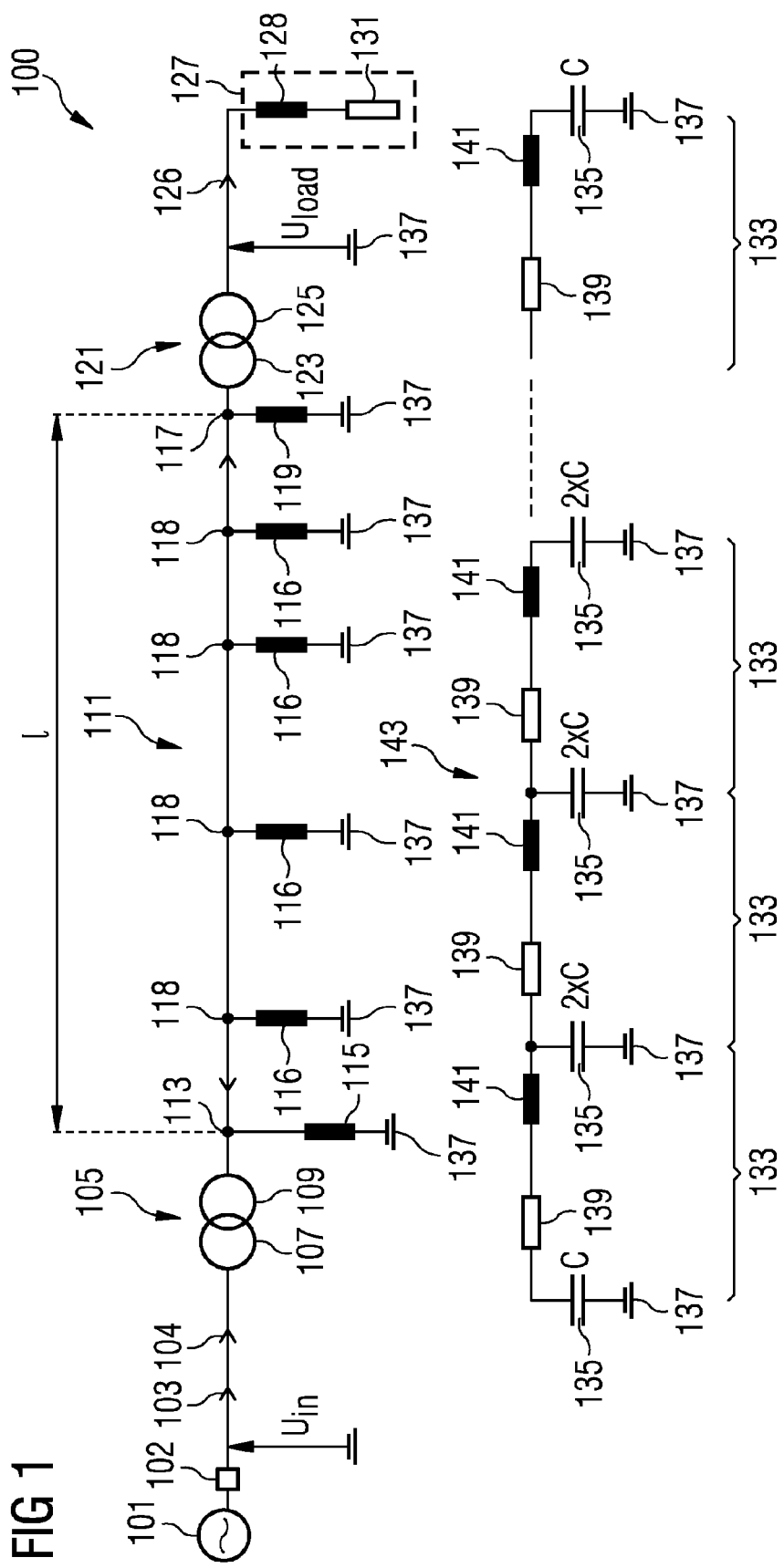
FIG. 1 schematically illustrates an exemplary apparatus for transferring electrical power in accordance with the present teachings.

The illustration in the drawings may be in schematic form and are not necessarily to scale.

FIG. 1 schematically illustrates an apparatus 100 for transferring electrical power in the sea in accordance with the present teachings. The apparatus 100 includes (e.g., above sea level) a power source 101 connected to a converter that is configured to generate AC power 103. The AC power 103 is supplied to a topside transformer 105 having a primary coil 107 that is inductively coupled to a secondary coil 109. The topside transformer 105 may transform a voltage of the AC power 103 to a higher voltage and supply the transformed voltage to a cable 101. The cable 101 may at least partly be arranged under water (e.g., in the sea). The cable 101 may have a length between 100 km and 1000 km. Further, the cable 101 may be used to supply the AC power 103 to a subsea exploration site or a subsea distribution grid.

The AC power 103 is associated with an input current 104. The voltage generated by the power supply 101 or output by the converter 102 is shown in FIG. 1 with reference character $U_{in}$ and is also referred to as first voltage. The topside transformer 105 provides the transformed voltage $U_{in}$ at a first end 113 of the cable 111. At the first end 113, a first reactor 115 is connected (e.g., to an earth potential) to compensate for a capacitor effect of the cable 111. The reactor connected at the first end 113 of the cable 111 may have a suitable adjusted or selected inductance or reactance to compensate for the capacitor effect of the cable 111.

In a conventional system, voltage may change from load condition to no-load condition around 200 km step-outs (e.g., cable length) at 50 Hz due to the parallel capacitor effects in the cable. The stationary effect of the capacitors in the cable may follow the equation $1/(j*w*C)$, where j is an imaginary number, $w = 2*pi*frequency$ and C is the capacitance. In accordance with the present teachings, when frequency is reduced or increased from 50 Hz, the effect of the capacitance in the cable may also be reduced stationary.

The AC power 103 is then transferred through the cable 111 to a second end 117 of the cable 111. The second end 117 is located under water (e.g., on the ground in the sea). At the second end 117 of the cable 111, a second reactor 119 is connected to the earth potential in order to compensate for the capacitor effect of the cable 111. Close to the second end 117 of the cable 101, a subsea transformer 121 is located. The subsea transformer 121 has a primary side 123 and a secondary side 125 that is inductively coupled to the primary side 123. The subsea transformer 121 transforms the voltage at the cable 111 (e.g., a voltage between 80 kV and 120 kV, in some embodiments around 90 kV) to a desired voltage at the subsea grid (e.g., a voltage between 30 kV and 50 kV, in some embodiments around 36 kV). At the secondary coil 125 of the subsea transformer 121, a load 127 is connected having an inductance 129 and a resistance 131. The load 127 may further include a capacitance (not shown). The load 127 may be a single load, a plurality of loads, and/or may represent an entire subsea distribution grid having a plurality of loads that may be connectable and disconnectable or switched on and off in any circuit topology.

In some embodiments, the cable 111 (e.g., the electrical properties of the cable 111) is modeled using a series connection of a plurality of PI-elements 133. Each PI-element 133 has a capacitor 135 connected to the earth potential 137 and a resistor 139 connected to one end of the capacitor 135. Each PI-element 133 further includes an inductance 141 that is connected in series with the resistor 139. The PI-elements 133 are connected in series as an equivalency circuit 143 for modeling or describing the electrical properties of the cable 111. The equivalence circuitry 143 is used in accordance with the present teachings to calculate electrical properties of the apparatus 100 (e.g., a second voltage $U_{load}$ representing the voltage applied to the load 127 when the power supply 101 provides a first voltage $U_{in}$).

In some embodiments, the equivalency circuit 143 may be used to calculate the second voltage $U_{load}$ given the first voltage $U_{in}$ for different power consumptions 126 of the load 127. Further, the input current 104 may be calculated using the equivalency electric diagram or circuit 143 for a given first voltage $U_{in}$ and a given power consumption 126 of the load 127. Based on such calculations, further more detailed simulations may be performed in order to determine electric properties of the apparatus 100. Frequency of the AC power 103 and/or voltage $U_{in}$ of the AC power 103 may be selected or adjusted based on, for example, a length l of the cable 111 and the power consumption 126 (e.g., active power consumption and/or reactive power consumption) of the load 127. In some embodiments, the first reactor 115 and the second reactor 119 may be missing from the apparatus 100 shown in FIG. 1 or may be switched off or disconnected.

In some embodiments, the power supply 101 is configured to adjust a frequency of the AC power 103 based on the length l of the cable 111 between the first end 113 and the second end 117 of the cable.

In other embodiments, additionally or alternatively, at least two reactors, such as the first reactor 115 and the second reactor 119, may be connected to the cable. One of the reactors may be connected to the first end (or close to the first end) 113 of the cable 111, and another reactor 119 may be connected close to the second end 117 of the cable 111. In other embodiments, additional reactors 116 may be connected along the cable 111 at a plurality of locations 118 that may be spaced apart from each other. In some embodiments, the locations 118 may be evenly spaced apart from each other. In some embodiments, the apparatus 100 may be configured in such a way that inductances of the first reactor 115 and the second reactor 119 (and, in some embodiments, inductances of the additional reactors 116) are selected in order to at least substantially compensate for reactive power generated in the cable 111. The values of the inductances of the first reactor 115, the second reactor 119, and the additional reactors 116 may depend on the properties of the cable 111 and/or the frequency/voltage of the power supply. The values of the inductances may also depend on additional parameters, such as voltage and cable length. The cable $1/(w*C)$ may be the same as the total compensation of the parallel inductances $w*L$. In such a case, $w*L$ may cancel out $1/(w*C)$.

In some embodiments, the power supply 101 includes a converter for changing the frequency of the AC power 103 guided through the cable 111 based on a value of the power consumption 126 of the load 127 that is connected to the second end (e.g., via the subsea transformer 121) of the cable 111.

A cable that is electrically described by resistance R [Ohm/m], inductance L [H/m] and capacitance C [F/m] may have cable resonances as a function of the cable travelling time. The wave velocity, v, of the cable, may be given by:

$$v=1/\mathrm{sqrt}(LC).$$

The travelling time of the cable is given by:

$$d/v.$$

In this expression, d (also referred to as l) is the length of the cable (e.g., the cable 111 shown in FIG. 1).

Resonances in the cable 111 may be found at the following travelling times (or frequencies):

1/4, 3/4, 5/4 . . . .

Further, damping frequencies may be found at:

2/4, 4/4, 6/4 . . . .

Figure 2:
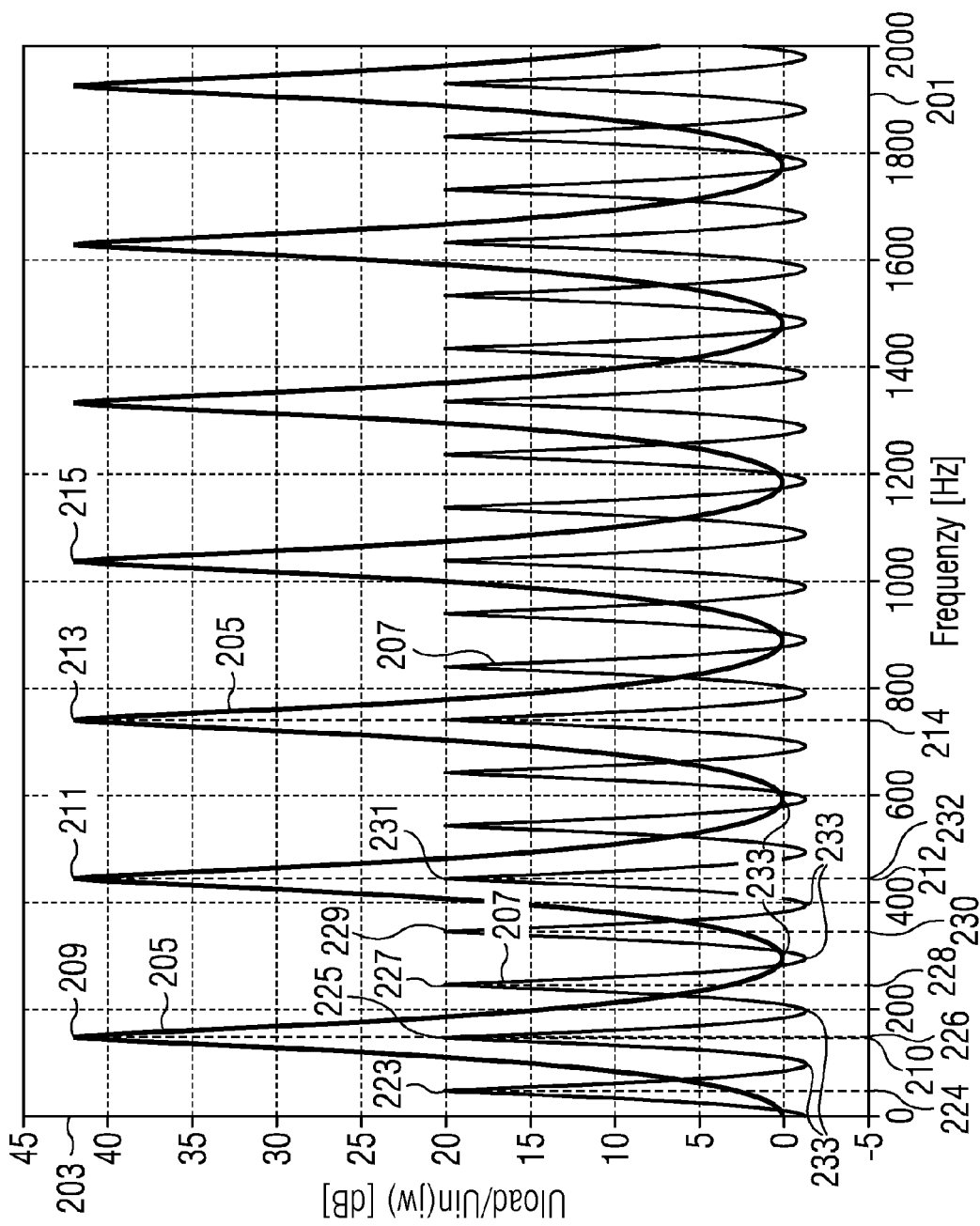
FIG. 2 shows a graph depicting an exemplary dependency of a voltage ratio vs. frequency of AC power for the apparatus of FIG. 1.

FIG. 2 shows a cable frequency plot illustrating a dependency of a voltage ratio (ordinate 203) on a frequency (abscissa 201). In some embodiments, the voltage ratio is the ratio between the second voltage $U_{load}$ and the first voltage $U_{in}$ (see FIG. 1). In some embodiments, the first curve 205 illustrates a situation corresponding to a length l of cable equal to 200 km, while the second curve 207 illustrates the situation when the length l of the cable 111 is 600 km. The first curve 205 and the second curve 207 represent calculated or simulated curves when the cable 101 is described or modeled with 500 PI-elements and the following electrical data (e.g. data from a 123 kV, 300 mm² cable):

Rc=0.0601 [Ohms/km]
Cc=0.17 e-6 [F/km]
Xc50=0.13 [Ohm/km]
Lc=4.1380 e-4 [H/km]

In some embodiments, the first curve 205 has first resonance peak 209, second resonance peak 211, third resonance peak 213, fourth resonance peak 215, and so on. Valleys of low values 221 that may correspond to the damping frequencies described above may be present in between the first resonance peak 209, the second resonance peak 211, the third resonance peak 213, and the fourth resonance peak 215.

In addition, the second curve 207 includes a first resonance 223, a second resonance 225, a third resonance 227, a fourth resonance 229, a fifth resonance 231, and so forth. Valleys 233 are also present between the first resonance 223, the second resonance 225, the third resonance 227, the fourth resonance 229, and the fifth resonance 231.

The frequencies of resonance peaks for cables of different lengths occur at different resonance frequencies. In some embodiments, the first resonance peak 209 occurs at a frequency 210, the second resonance peak 211 occurs at a frequency 212, and the third resonance peak 213 occurs at a frequency 214. For a cable of length 600 km, the first resonance 223 occurs at a frequency 224, the second resonance 225 occurs at a frequency 226, the third resonance 227 occurs at a frequency 228, the fourth resonance 229 occurs at a frequency 230, the fifth resonance 231 occurs at a frequency 232, and so forth. The frequencies (e.g., 210, 212, 214, and so forth) of the resonance peaks of the first curve 205 are different than the frequencies (e.g., 224, 226, 228, 230, 232, and so forth) of the resonance peaks of the second curve 207. This observation may be used in accordance with the present teachings to provide a reliable transfer of electrical power 103 from a topside facility to a subsea exploration site.

In some embodiments, based on the relationship d/v, the first resonance peak 209, the second resonance peak 211, the third resonance peak 213, and the fourth resonance peak 215 may be at 149.0 Hz, 447.1 Hz, 745.2 Hz, 1043.2 Hz, and 1341.3 Hz for a cable of length 200 km. The first resonance peak 209, the second resonance peak 211, the third resonance peak 213, and the fourth resonance peak 215 may be at 49.7 Hz, 149.0 Hz, 248.4 Hz, 347.7 Hz, and 447.1 Hz for a cable of length 600 km.

In some embodiments, an input current 104 that depends on the frequency may be calculated for the representative cable lengths considered in FIG. 2.

Figure 3:
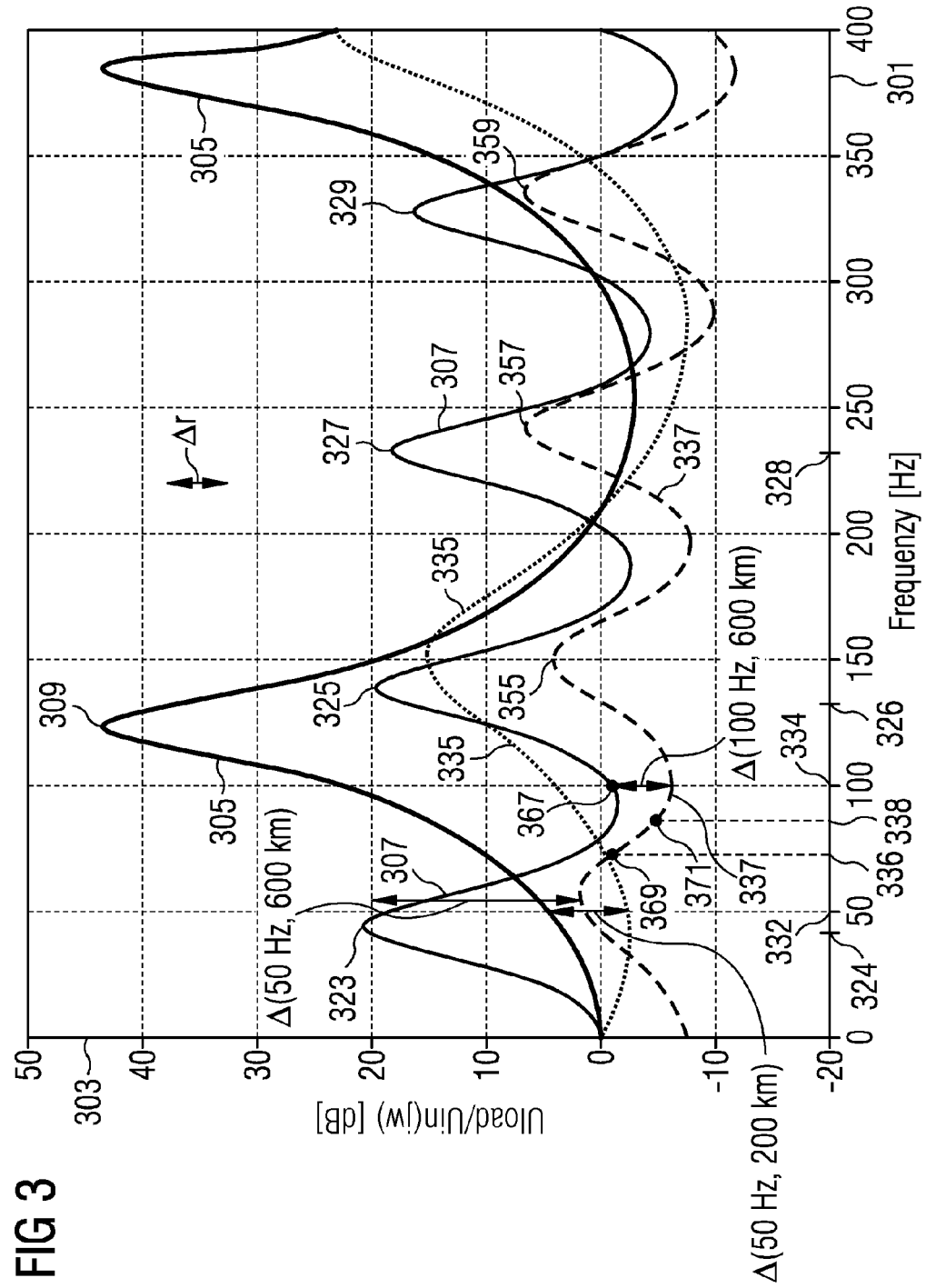
FIG. 3 shows a portion of the graph of FIG. 2 illustrating an exemplary method for transferring electrical power by the apparatus of FIG. 1 in accordance with the present teachings.

FIG. 3 illustrates a portion of the first curve 205 and the second curve 207 of FIG. 2 as, respectively, the curve 305 and the curve 307 for a situation when the power consumption 126 of the load 127 is substantially zero (e.g., substantially no load 127 is connected to the second end 117 of the cable 111, as shown in FIG. 1).

In addition to illustrating the situation where no load is connected to the cable 101, FIG. 3 further illustrates curve 335 (dotted line) and curve 337 (dashed line) corresponding to the situation when a load of 80 MW is connected to the second end 117 of the cable 111. Thus, the curve 335 represents the situation when the length of the cable is 200 km and the power consumption 126 of the load 127 is 80 MW. The curve 337 represents the situation where the length of the cable is 600 km and the power consumption 126 of the load 127 is 80 MW. In some embodiments, the first transformer 105 and the second transformer 121 shown in FIG. 1 are 100 MVA transformers, the load impedance values are 90 kV, and the power factor is 0.95. All transformer and motor voltages in the apparatus 100 are 90 kV.

Figure 4:
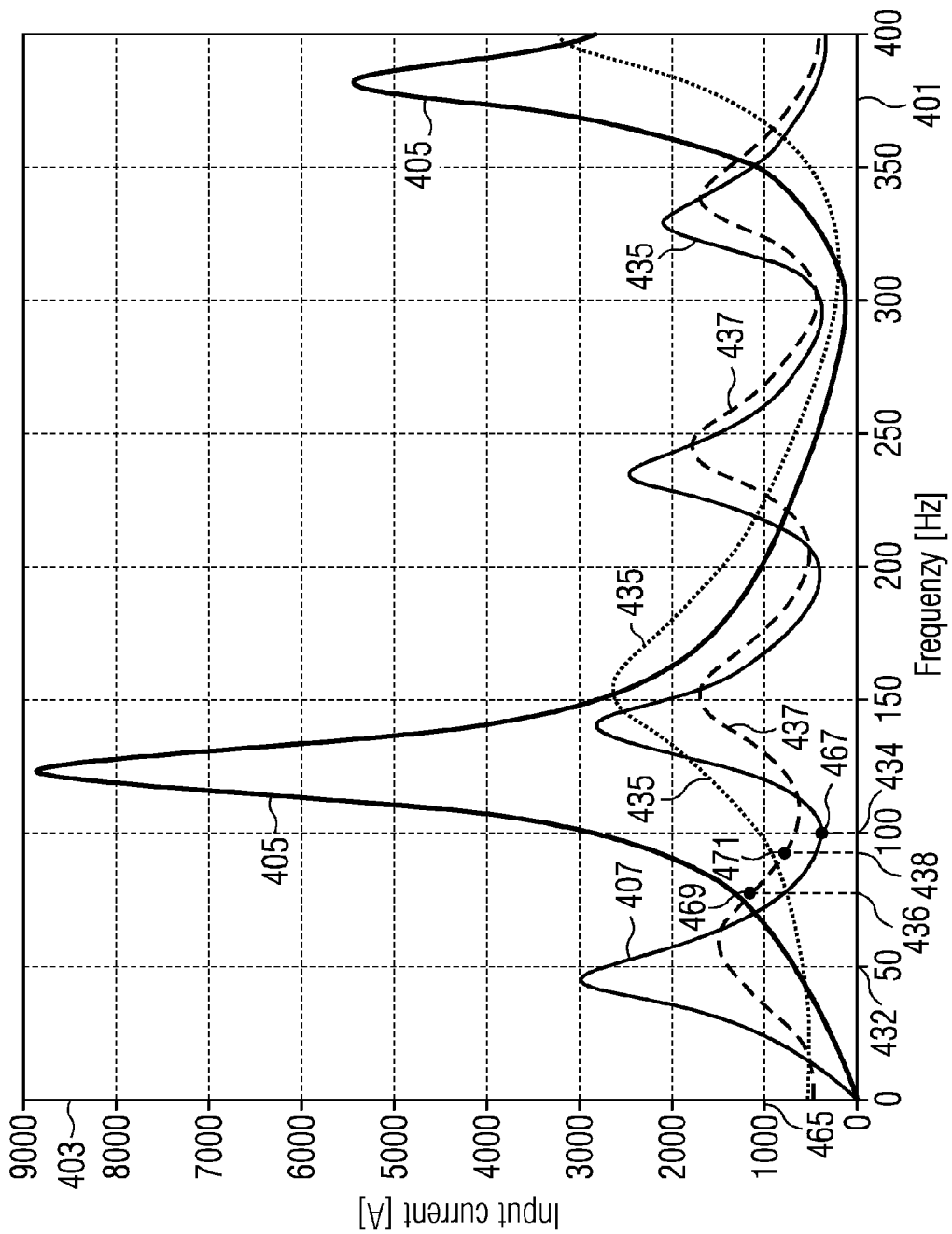
FIG. 4 shows a graph depicting an exemplary dependence of an input current vs. frequency, and illustrates an exemplary method for transferring electrical power by the apparatus of FIG. 1 in accordance with the present teachings.

FIG. 4 shows a dependency of input current 104 (ordinate 403) on frequency (abscissa 401) for lengths 1 of cable equal to 200 km and 600 km with no load or an 80 MW load connected to the second end of the cable 101. In FIG. 4, the reference characters of the input current curves differ from the corresponding voltage ratio curves shown in FIG. 3 only in their first digits. For example, the curve 405 and the curve 435 represent the input current of a 200-km long cable having no load or an 80 MW load, respectively, connected at the second end of the cable 111. In addition, the curve 407 and the curve 437 correspond to a cable of length 600 km having no load or an 80 MW load, respectively, connected at the second end of the cable.

As indicated by FIGS. 3 and 4, 50 Hz (see abscissa 301 in FIG. 3 and abscissa 401 in FIG. 4) may be taken as a working frequency for a 200-km long cable (e.g., 200 km step out). The frequency of 50 Hz is indicated by reference character 332 in FIG. 3 and reference character 432 in FIG. 4. At 50 Hz, for a 200-km cable, the change in voltage ratio for a situation where there is no load connected to the cable vs. a situation with an 80 MW load is indicated by the value (50 Hz, 200 km). However, for the case of a 600-km long cable, the respective change (50 Hz, 600 km) is very large (e.g., bigger than the threshold r indicated in FIG. 3), such that a large voltage change occurs upon changing the load from no load to 80 MW. Thus, a 600-km cable may not be operated at 50 Hz due to voltage amplification and high resonance currents. A comparison of the curve 407 and the curve 437 for the case of a 600-km long cable indicate that the currents at 50 Hz are bigger than allowed according to a rating of the cable. A rating limit (e.g., a current of 1000 A) is indicated in FIG. 4 by reference character 465.

However, at a frequency of 100 Hz (reference character 334 in FIG. 3 and reference character 434 in FIG. 4), the change in voltage ratio (100 Hz, 600 km) from no load to an 80 MW load is reasonably small, and the currents of the curve 407 and the curve 437 at 100 Hz are below the rating limit 465 of the cable. In some embodiments, the following electrical properties are obtained after simulating transfer of AC power 103 with a frequency of 100 Hz through a cable 101 having a length l=600 km:

100 Hz and 600 km Cable:
Uload/Uin no load: −1.095 dB=10^(−1.095/20)=0.8816
Uload/Uin load: −6.169 dB=10^(−6.169/20)=0.4915
Input current no load: 367.5 A
Input current load: 686.4 A For this frequency, the voltage difference is 39.0% based on nominal values. At the same time, the current is close to the nominal current of the cable of 510 A. The cable cross-section may be increased to 400 mm$^2$, such that the cable current may be in the range of 700 A. Iteration may be performed to find a suitable cable and frequency.

If the subsea transformer is designed with a high secondary voltage to step the voltage up to 1.3 times the nominal subsea distribution voltage, the voltage drop during load may be limited compared to nominal load. The example below may be used for a 600 km, 80 MW subsea grid.

100 Hz Case Based on FIGS. 3 and 4
Topside Transformer:
Sn_tt=100 MVA
Un_sec=90 kV
Voltage reserves=1.35
Subsea Transformer:
Sn_ts=100 MVA
Un_pri=79.2 kV
Un_sec=36 kV
Voltage reserves=1.35
Subsea Distribution:
Un_distr=27.7 kV
Umax_distr=36 kV (during no-load)
Umin_distr=20.1 kV (during 80 MW load)
Cable Input Current:
Iin_min=367.5 A (during no-load)
Iin_max=686.4 A (during 80 MW load)
Simulated 100 Hz Case with Optimized Subsea Transformer Ratio
Topside Transformer:
Sn_tt=100 MVA
Un_sec=90 kV
Voltage reserves=none
Subsea Transformer:
Sn_ts=100 MVA
Un_pri=85.5 kV
Un_sec=36.0 kV
Voltage reserves=none
Subsea Distribution:
Un_distr=27.7 kV
Umax_distr=35.9 kV (during no-load, corresponds to 1.3×Un_distr)
Umin_distr=23.4 kV (during 60 MW load, PF=0.97, corresponds to 0.85×Un_distr)
Cable Input Current:
Iin_min=365.4 A (during no-load)
Iin_max=895.8 A (during 60 MW load, PF=0.97)
Cable Maximum Voltage and Current:
Ic_max=1004 A (during no-load, lower during load)

Ic_max=91 kV (during no-load at topside, lower during load)

Since a cable current of 1004 A may be handled in the cable studied, 600 km step out case with 60 MW, PF=0.97 may be achieved. The voltage variations may be within the limits of a subsea system. The load may be increased above 60 MW if voltage is increased topside as a function of the system load.

To reduce the cable current during full load (e.g., to approximately 510 A), the topside voltage may dynamically be increased about 35% (e.g., cable voltage rating may be 123 kV). There may be a risk that parts of the load will be tripped during full load operation, and that over voltages into the subsea transformer primary side and switchgear may occur. Since one cable may be loaded with several loads, the danger of tripping all loads at the same time may not be realistic. The voltage source may be a converter topside supplying the 100 Hz voltage to the cable. The voltage source may be programmed to trip very fast (e.g., within milliseconds) based on events with sudden current changes. The subsea transformer may also be configured such that the subsea transformer core during a trip of loads may be saturated and used as an over voltage protection.

When the cable length increases, the damping bands may get narrower, and the importance of a clean harmonic free source and load may increase. The voltage topside may be regulated to provide a stable voltage subsea. In some cases, varying the frequency may also be performed.

The challenge of long step outs may also be addressed via compensation according to cable reactive power. FIGS. 5 and 6 show curves that may be calculated based on 50 Hz. The curves with end compensation have a reactor at each end of the cable (e.g., the total number of reactors is two). In the case of along compensation, reactors may be equally distributed along the cable with the same reactive total value as for the end compensation, (e.g., the total number of rectors is 50). The compensation units may be a clean inductor or may be combined with a passive or active filter to further shape the resonance/damping frequencies.

In some embodiments, the apparatus 100 may first be operated at a working point 367 as shown in FIG. 3 (or at a corresponding working point 467 as shown in FIG. 4). For example, the apparatus 100 may first be operated at 100 Hz for a 600-km long cable, wherein substantially no load is connected to the second end 117 of the cable 111. Starting from the point 367, the power consumption 126 of the load 127 may be increased (e.g., up to a power consumption of 80 MW). Upon increasing the power consumption 126, the frequency of the AC power 103 may be decreased to reach an operation point 369 as shown in FIG. 3. The frequency is at a value labeled by reference character 336 that corresponds to about 70-75 Hz. Upon decreasing the frequency from 100 Hz to about 70-75 Hz, the change in the voltage ratio from a situation of no load to a situation of an 80 MW load is substantially zero. Thus, no voltage change (e.g., no voltage drop) may occur when the frequency is changed from 100 Hz to about 70-75 Hz upon increasing the power consumption from 0 to 80 MW.

The different working points are shown in FIG. 4 with reference characters differing from those in FIG. 3 by only their first digit. As indicated in FIG. 4, the working point 467 (e.g., corresponding to 100 Hz for a 600-km long cable with no load) corresponds to an input current that is well below the rating limit 465 (e.g., assumed to be 1000 A). However, the working point 469 (e.g., corresponding to the case of a 600-km cable having an 80 MW load connected to the cable) corresponds to an input current that is above the rating 465. In this example, either the rating of the cable (e.g., the cable properties) may be adapted or selected, or another working point 471 may be chosen such that the change in the voltage ratio is within an acceptable limit and the input current is below the rating 465.

As indicated in FIGS. 3 and 4, each of the first working point 367, the second working point 369, and the third working point 371 lies between a first resonance peak 323 and a second resonance peak 325.

FIGS. 5 to 8 shows graphs based on using a compensation method in accordance with the present teachings to compensate for the capacitor effect of the cable 111. The compensation methods may be applied exclusively or in combination with the adjustments/selections of frequency that have been described above in reference to FIGS. 2-4.

The abscissas in FIGS. 5-8 (e.g., reference characters 501, 601, 701, and 801) denote frequency. The ordinates in FIGS. 5 and 7 (e.g., reference characters 503 and 703) denote the voltage ratio of the second voltage $U_{load}$ and the first voltage $U_{in}$. The ordinates in FIGS. 6 and 8 (e.g., reference characters 603 and 803) denote the input current 104. FIGS. 5 and 6 correspond to a cable length l=600 km and illustrate examples where reactors are connected at the first end 113 and the second end 117 of the cable (e.g., curve 505 corresponds to no load and curve 507 corresponds to an 80 MW load) or where a plurality of reactors are connected along the cable (e.g., curve 509 corresponds to no load and curve 511 corresponds to an 80 MW load). The reactors are selected to compensate for 50 Hz (e.g., the reactors first reactor 115, the second reactor 119, and the additional reactors 116 shown in FIG. 1). The curve 505 and the curve 507 shown in FIG. 5 have the first reactor 115 and the second reactor 119 at each end of the cable 111. Thus, the total amount of reactors is two. The curve 509 and the curve 511 shown in FIG. 5 have the additional reactors 116 equally distributed along the cable with the same reactive total value as for the end compensation. In this example, the total number of additional reactors 116 is 50 although different numbers may also be used. The compensation units (also referred to as first reactor 115, additional reactors 116, and second reactor 119) may be clean inductors or may be combined with a passive or active filter to further shape the resonances/damping frequencies. For 100 Hz, the change in the voltage ratio (100 Hz, along) with reactors distributed along the cable is smaller (e.g., than the threshold r) than the voltage ratio (100 Hz, end) with reactors connected at the two ends of the cable.

When the size of the first reactor 115, the additional reactors 116, and/or the second reactor 119 is changed to 16.7 Hz, compensation and the other parameters are kept constant as in the 50 Hz case illustrated in FIGS. 5 and 6, and the graphs shown in FIGS. 7 and 8 are obtained. The curves in FIGS. 7 and 8 are labeled with reference characters that only in their first digit as compared to corresponding reference characters used in FIGS. 5 and 6.

By appropriately adjusting the reactive total value of the first reactor 115, the additional reactors 116, and the second reactor 119, a change in the voltage ratio may be kept within acceptable limits, and the input current may be kept below a rating limit of the cable 111.

In FIGS. 5-8, a compensation according to the reactive power of the cable 111 is used. If the first reactor 115 and the second reactor 119 and/or the additional reactors 116 shown in FIG. 1 are added or connected to the cable 111, the voltage values and current values according to FIGS. 5 and 6 are obtained when the reactors compensate for 50 Hz. The first reactor 115 and the second reactor 119 and also the additional reactors 116 may be a clean inductor or may be combined with a passive or active filter to further shape the resonance/damping frequencies.

The first reactor 115, the second reactor 119, and the additional reactors 116 are provided to reduce or even remove the capacitor effect of the cable 111. The first reactor 115, the second reactor 119, and the additional reactors 116 may be used in combination with one or more other measures or approaches to stabilize the voltage at the subsea site.

FIG. 5 shows the change in the voltage ratio ($U_{load}/U_{in}$) (100 Hz, end) for the compensation using the first reactor 115 and the second reactor 119, and the change in the voltage ratio (100 Hz, along) for the case where the plurality of additional reactors 116 are connected at different locations 118 along the cable. As indicated in FIG. 5, the respective changes of the voltage ratios are different for different frequencies, and the frequency may be selected to minimize the respective voltage ratio difference.

Furthermore, the inductances and/or frequency may be selected such that the input current, as shown for example in FIG. 6, is within the range of the rating of the cable (e.g., a limit current of 1000 A). As indicated in FIG. 6, the currents at a frequency of 50 Hz are well below the current limit of 1000 A. Also, for a frequency of 100 Hz, the currents are below the current limit 665.

Further, as indicated in FIG. 5, the voltage ratio change (along) at 100 Hz is smaller than the voltage ratio change (along) at 50 Hz. Based on one or more criteria, the optimal frequency may be selected from the curves in FIG. 5, 6, 7 or 8 depending on the equipment.

In accordance with the present teachings, three main approaches are described to provide a method and an apparatus for transferring electrical power in the sea. The first approach uses the resonance effect active in the cable to stabilize the voltage at subsea (e.g., by selecting/adjusting frequency depending on cable length). A second approach performs a reactive compensation of a subsea supply cable along the length or at end points of the cable to limit the capacitive effect of the cable. A third approach uses, for example, a topside converter to generate a frequency and may apply or employ the converter, to vary (e.g., slowly) the topside frequency and/or voltage as a function of a power consumption of the load connected at the subsea location. Further, in the case of a trip of the load, the topside source may react quickly by tripping or by actively regulating down the voltage and damping out transients.

In accordance with the present teachings, the three above-described approaches may be performed separately or in any combination. By way of example, in some embodiments, the first approach, the second approach, and the third approach may each be performed separately without performing the respective other approaches. Alternatively, in other embodiments, two of the approaches, (e.g. the first and the second, the first and the third, or the second and the third) may be performed in combination. In other embodiments, all three of the approaches may be performed in combination.

In some embodiments, according to the first approach, the cable capacitor effect may be used to stabilize the subsea voltage (e.g., in situations ranging from no load being connected to a load with a high power consumption being connected to the end of the cable located at the subsea location). The first approach may be performed, for example, by using frequencies that are higher than the lowest resonance frequency of the cable. The first approach may be an alternative in extreme long step-outs where the first cable resonance comes in conflict with the fundamental 50 Hz in a standard AC system.

The second approach may be used to compensate for the reactive power generated in the cable (e.g., along the cable or at the ends of the cable). In this approach, a voltage drop ranging from no-load to a high power consumption load may be given by the serial impedance. The second approach may provide a solution for shorter step-outs, such as step-outs (e.g., cable lengths) between 100 km and 300 km.

In some embodiments, power consumption of the load may be in the range of 50-100 MW. Further transient conditions may be taken into account. A topside converter may be configured to damp out transients in the cable system.

In some embodiments, a working frequency may be set such that core losses and skin/proxy-effect are in reasonable limits.

It should be noted that the term "comprising" does not exclude other elements or acts, and that the articles "a" and "an" do not exclude pluralities. In addition, elements described in association with different embodiments may be combined.

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding claim—whether independent or dependent—and that such new combinations are to be understood as forming a part of the present specification.

The invention claimed is:

1. A method for transferring electrical power in the sea, the method comprising:
   generating AC power;
   guiding, at least partially underwater, the AC power through a cable from a first end of the cable to a second end of the cable;
   wherein a first reactor is connected adjacent to the first end of the cable;
   wherein a second reactor is connected adjacent to the second end of the cable;
   wherein inductances of the first reactor and inductances of the second reactor are selected to at least partially compensate for reactive power generated in the cable;
   wherein the inductances of the first reactor and second reactor are adjusted to avoid resonances close to a frequency of the AC power; and
   adjusting the frequency of the AC power such that a voltage ratio between a second voltage and a first voltage changes less than a threshold, when a power consumption of a load connected to the second end of the cable changes from a first value to a second value;
   wherein the second voltage is indicative of a potential difference between the second end of the cable and a reference potential;
   wherein the first voltage is indicative of a potential difference between the first end of the cable and the reference potential.

2. The method of claim 1, wherein one or more additional reactors is connected along the cable between the first end of the cable and the second end of the cable.

3. The method of claim 2, wherein the inductances of the first reactor and the inductances of the second reactor, wherein the inductances of the one or more additional reactors, or wherein the inductances of the first reactor, the inductances of the second reactor, and the inductances of the one or more additional reactors are each selected based on a frequency of the AC power and a property of the cable.

4. The method of claim 2, wherein the first reactor and the second reactor, wherein the one or more additional reactors, or wherein the first reactor, the second reactor, and the one or more additional reactors are connectable and disconnectable from the cable.

5. The method of claim 2, wherein at least one of the first reactor, the second reactor, and the one or more additional reactors comprises an active filter, a passive filter, or an active filter and a passive filter.

6. The method of claim 2, wherein the first reactor and the second reactor, wherein the one or more additional reactors, or wherein the first reactor, the second reactor, and the one or more additional reactors provide reactive compensation for 16.7 Hz or 50 Hz.

7. The method of claim 1, wherein the adjusting of the frequency comprises:
calculating a plurality of voltage ratio changes;
considering at least two test power consumptions of loads for each test frequency of a plurality of test frequencies in order to obtain a respective voltage ratio change; and
selecting the frequency to be adjusted from the plurality of test frequencies having a calculated voltage ratio change that is lower than the threshold.

8. The method of claim 1, further comprising:
calculating a plurality of input currents, wherein each input current of the plurality of input currents represents a respective current of the generated AC power supplied to the first end of the cable;
considering at least one test power consumption of a load for each test frequency of a plurality of test frequencies; and
selecting the frequency to be adjusted from the plurality of test frequencies having an input current that is within a range determined by a rating of the cable.

9. The method of claim 1, further comprising:
selecting a frequency between resonance peaks of a calculated voltage ratio curve, wherein the frequency depends on a property of the cable.

10. The method of claim 1, further comprising:
transforming a voltage of the AC power to a higher voltage and supplying the transformed voltage to the first end of the cable;
transforming the AC power guided through the cable at the second end of the cable and supplying the transformed AC power to a load; or
transforming the voltage of the AC power to the higher voltage, supplying the transformed voltage to the first end of the cable, transforming the AC power guided through the cable at the second end of the cable, and supplying the transformed AC power to the load.

11. The method of claim 1, wherein:
a frequency of the AC power is between 10 Hz and 300 Hz;
at least a portion of a length of the cable is arranged underwater; and
the AC power is supplied from a AC power supply to the first end of the cable.

12. The method of claim 1, further comprising:
adjusting the frequency, the first voltage, or the frequency and the first voltage based on the load;
wherein the adjusting comprises decreasing the frequency when power consumption of the load increases;
wherein the first voltage is predetermined;
wherein the second voltage is calculated for a given power consumption of the load using a model of the cable comprising a plurality of PI-elements;
wherein the second end of the cable is between 1000 m and 4000 m below sea level;
wherein the cable has a length between 100 km and 1000 km; and
wherein the voltage at the cable is between 80 kV and 100 kV.

13. The method of claim 1, wherein between 3 and 60 additional reactors are connected along the cable between the first end and the second end.

14. The method of claim 1, wherein the voltage ratio between the second voltage and the first voltage changes less than the threshold when the power consumption of the load connected to the second end of the cable changes from 0 MW to 100 MW.

15. The method of claim 7, further comprising:
calculating a plurality of input currents, wherein each input current of the plurality of input currents represents a respective current of the generated AC power supplied to the first end of the cable;
considering at least one test power consumption of a load for each test frequency of the plurality of test frequencies; and
selecting the frequency to be adjusted from the plurality of test frequencies having an input current that is within a range determined by a rating of the cable.

16. The method of claim 1, further comprising:
selecting a frequency between a first resonance peak and a second resonance peak of a calculated voltage ratio curve or between a second resonance peak and a third resonance peak of the calculated voltage ratio curve;
wherein the frequency depends on a cross-sectional size of the cable, a material of the cable, or the cross-sectional size and the material of the cable.

17. The method of claim 1, wherein a frequency of the AC power is between 50 Hz and 150 Hz.

18. The method of claim 1, wherein a frequency of the AC power is different than 50 Hz.

19. The method of claim 11, wherein:
at least 80% and up to 100% of the length of the cable is arranged underwater; and
the AC power is supplied to the first end of the cable from a generator or a converter.

20. The method of claim 12, wherein the cable has a length between 200 km and 600 km.

21. An apparatus configured to transfer electrical power in the sea, the apparatus comprising:
a power supply configured to generate AC power;
a cable configured to guide, at least partially underwater, the AC power through the cable from a first end of the cable to a second end of the cable;
a first reactor connected adjacent the first end of the cable; and
a second reactor connected adjacent the second end of the cable;

wherein inductances of the first reactor and inductances of the second reactor are selected to at least partially compensate for reactive power generated in the cable;

wherein the inductances of the first reactor and second reactor are adjusted to avoid resonances close to a frequency of the AC power; and wherein the frequency of the AC power is adjusted such that a voltage ratio between a second voltage and a first voltage changes less than a threshold, when a power consumption of a load connected to the second end of the cable changes from a first value to a second value; wherein the second voltage is indicative of a potential difference between the second end of the cable and a reference potential; wherein the first voltage is indicative of a potential difference between the first end of the cable and the reference potential.

\* \* \* \* \*